United States Patent Office 3,839,494
Patented Oct. 1, 1974

3,839,494
THIOL-DIENE ADDUCTS AS EPOXY RESIN CURING AGENTS
Richard A. Hickner, Midland, and Edward W. Goss, Auburn, Mich., assignors to The Dow Chemical Company, Midland, Mich.
No Drawing. Original application Nov. 16, 1970, Ser. No. 90,022, now Patent No. 3,734,968. Divided and this application Nov. 21, 1972, Ser. No. 308,499
Int. Cl. C08g 45/06
U.S. Cl. 260—830 TW     6 Claims

ABSTRACT OF THE DISCLOSURE

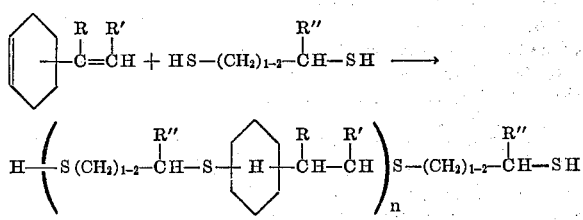

wherein $n$ is 1–5, one of R and R' is hydrogen and the other is hydrogen or methyl, and R" is hydrogen or methyl with the average molecular weight of product not above about 700; illustratively, ethanedithiol reacts with 4-vinylcyclohexene to yield a product in which on average $1 < n < 3$. The products are liquids of low viscosity adapted to be used as curing agents for various plastics including epoxy resins.

---

This is a division, application Ser. No. 90,022 filed Nov. 16, 1970 now Pat. No. 3,734,968.

BACKGROUND OF THE INVENTION

Field of the Invention

This invention presents highly reactive polyfunctional substances that are coreactive with numerous other polyfunctional substances to yield plastics that are, depending upon the coreactant chosen, thermoplastic or thermoset: such reaction, when it yields a thermoset resin, is often, and herein, called a "cure" and such reactant as that of this invention is often and herein spoken of as a "curing agent."

THE PRIOR ART

In U.S. Pat. 2,347,182, Coffman teaches the reaction under mercury light or at 100–150° C. or both of an organic dithiol with an equimolecular amount of a diene, to obtain a polymer. When he reacted vinylcyclohexene-3 with ethanedithiol, his product (Example IX) had a molecular weight of about 1,060. This would represent an average of about 5 vinylcyclohexene moieties with about the same number of ethanedithiol moieties. The product had a viscosity of 1,000 to 2,000 centipoises.

In U.S. Pat. 3,403,187 Oswald, et al. teach the reaction of allene with a dithiol to obtain a polymer, and they teach that with large excess of allene they obtain the diadduct. Their products are said to be particularly useful as curing agents for tri- or poly-functional reactive substances such as polybutadiene or butadiene styrene copolymers, and lead to production of room temperature cured rubbers, foams, and elastomers.

In U.S. Pat. 3,506,626, Warner, et al. teach the reaction of a diolefin with a cycloaliphatic dimercaptan and his Example 1 shows the reaction of 4-vinylcyclohexene wtih "ethylcyclohexyl dimercaptan." With a "sulfurzinc" cure they obtain cured polymers of which some had elastomeric properties.

Much effort has been expended in quest of sulfur-linked polymers. The art herein made of record is the closest known to the inventors.

DESCRIPTION OF THE PRESENT INVENTION

A vinylcyclohexene is caused to react with a dithiol. It accepts two moles of the dithiol per mole of cyclohexene to obtain a condensation product resulting from the breaking of both double bonds and resulting in a new dithiol of higher, and mixed molecular weight.

In general form, and with no attempt to exhaust the isomery involved, the reaction follows the form of

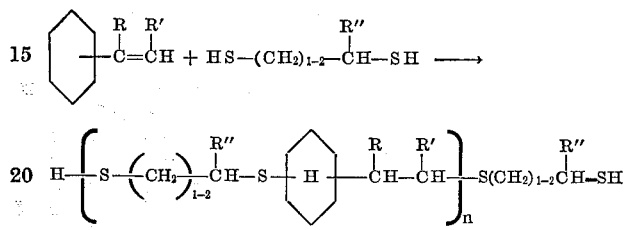

wherein $n$ is 1–5, one of R and R' is hydrogen and the other is hydrogen or methyl, and R" is hydrogen or methyl.

Under accepted conventions of chemical nomenclature, when both of R and R' are hydrogen, the unsaturated starting compound is a vinylcyclohexene. When R is methyl and R' is hydrogen, the compound is called an isopropenylcyclohexene, rather than a "2-methylvinyl" cyclohexene, and when R is hydrogen and R' is methyl, the compound is called a propenylcyclohexene rather than a "β-methylvinyl" cyclohexene. The products of this invention are mixtures of pure chemical entities and are, necessarily, of an average molecular weight of not more than about 700 and may be lower.

In any vinyl cyclohexene in the sense here shown, the ring carbon atoms at each end of the ring double bond are said to be the atoms numbered 1 and 2, and further numbering proceeds around the ring in the course that, assigning each carbon atom a next number, assigns to the carbon atom bearing the vinyl (or propenyl or isopropenyl) group the lowest available number, thus

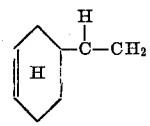

is designated as 4-vinylcyclohexene,

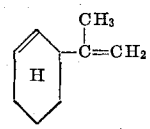

is designated as 3-isopropenylcyclohexene, and

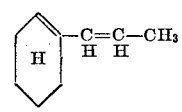

could be designed as 2-propenylcyclohexene or 1-propenylcyclohexene. The latter name is used because it results in use of lower numbers.

Thus, the present genus of "vinyl" cyclohexenes includes three ring position isomers.

The dithiol to be used is of the formula

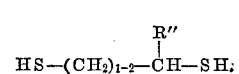

When the subscript value is 1 and R'' is hydrogen, the compound is 1,2-ethanedithiol. When the subscript is 1 and R'' is methyl, the compound is 1,2-propanedithiol. When the subscript is 2 and R'' is hydrogen the compound is 1,3-propanedithiol or synonymously, trimethylenedithiol. When the subscript is 2 and R'' is methyl, the compound is 1,3-butanedithiol. Thus the present genus of dithiols includes four compounds.

Elegant purity of the products of the instant invention, in the sense of freedom from cogeners, is a criterion only in the sense that an upper limit average molecular weight is necessary. Subject to this sole limitation, the "vinyl" cyclohexene is any isomer or any mixture of isomers; and, independently, the dithiol is any of the dithiols or any mixture of them. Correspondingly, the reaction products are usually of mixed identity.

The criterion in the products of this invention is, rather, in their extraordinary merit in curing resins, such as epoxy resins.

In achieving a product that is of greatest value in the curing of an epoxy resin it will oftentimes be preferred to seek a cogeneric mixture of substances, the mixture comprising at least diverse substances varying in the value of $n$ recurring units, as earlier noted. This variety, which can be seen as a variety of chain lengths, is believed to contribute desirable properties, such as impact resistance, to the resulting cured resins.

The products of this invention are liquids of viscosity that, in the Gardner system, is expressible as not greater than about T–U and in the falling-ball system, not greater than about 6.5 stokes. A viscosity within this range is essential and critical to the best practice of this invention.

In preparing the dithiols of this invention, it is convenient although not a complete necessity to catalyze the preparative reaction by the use of a small catalytic amount of a free-radical reaction initiator. The preferred such catalyst is of the redox type, and 2,2'-azobis(2-methylpropionitrile), often called "azobisisobutyronitrile" is the most satisfactory. However, radiation from cobalt 60, ultraviolet light, various peroxide catalysts, and others can be used. When using the azobisisobutyronitrile catalyst, the use of from 0.05 to about 1 percent by weight of total reactants gives good results.

In carrying out preparation of the products of this invention, the starting materials are intimately mixed and stirred together, with heating to a temperature at which reaction initiates readily and preferably with catalysts. The reaction takes place readily at modest reaction temperatures without byproduct, although traces of nitrogen are usually released by the mentioned nitrile catalyst.

The reaction, although requiring a temperature from 50° to 100° C. to initiate, in the presence of catalyst, is modestly exothermic and good results are obtained when one reactant is mixed with catalyst and heated to a reaction temperature, and the other reactant is added slowly in portions or as a slow stream, at such rate that involved heat of reaction escapes or can be removed.

When reactants are combined in this preferred manner, catalytic substance, if employed, is satisfactorily added to one or, optionally, both, of the reactants prior to their being brought together. Preferably the catalyst is added to the loweralkanedithiol reactant; doing so, as over against adding it to the vinylcyclohexene reactant, tends to make easier the holding down of product molecular weight.

In the products of this invention, when $n$ in the foregoing formulas is 1, dithiol is consumed in the ratio of two moles per mole of diene. However, when $n$ becomes 2, then three moles of dithiol are consumed with two of diene or a ratio of 1.5:1. When $n$ becomes 3, then four moles of dithiol are consumed with three of diene, or a ratio of about 1.3:1.

It follows that the molecular weight of product is to some extent dependent on the mole ratio of the supplied starting materials. When following the procedure outlined above, the initial ratio of dithiol to diene is extremely high, with continuing addition of diene to a fixed quantity of dithiol, the reaction producing the present product consumes portions of the dithiol; in effect, the mole ratio declines.

Good results are obtained when the total supply of reactants represents 1.25 mole dithiol per mole of diene, but preferable results are obtained from the use of 1.75 or more moles of dithiol per mole of diene. It will seldom be desired that total supply of dithiol exceed twelve molar equivalents of diene.

The discussion hitherto has implied the batchwise synthesis of the dithiols of this invention; and such batchwise synthesis is practical. However, the supply of reactants, in proportions relative to one another of the range hitherto pointed out, can be brought, together with catalyst, to a tubular or other continuous reactor, feedstock being introduced at one end and product withdrawn from the other. Product typically issues from such reactor in the presence of excess loweralkanedithiol; following reaction, continuous flash distillation removes such starting material, and the dithiol starting material is recycled, if desired, to the feedstock input.

A preferred initial reaction temperature range is about 70 to 75° C. Good results are obtained when heat of exotherm is removed or permitted to escape at such a rate that upper limit temperatures do not exceed about 80° C.

Actual addition times of diene to catalyzed dithiol are to be adjusted according to reaction temperature rather than by duration, but from one to about six hours is typical.

While not necessary, the use of inert gas blanket is desired, in the reaction vessel and over the surface of reaction mixture.

Upon completion of the addition of the diene, the resulting reaction mixture is thereafter held for an additional period of up to from three to eight hours at reaction temperature, such as 70 to 75° C. to carry the reaction to completion.

The dithiol reactant is inherently malodorous although, perhaps by reason of molecular weight the products are unobjectionable. In view of this it will usually be preferred and may be imperative to pass the finished reaction mixture through flash distillation to remove any unreacted dithiol. As the present products are mixtures, they do not have a clean, single boiling temperature; but the lowest product boiling temperature is substantially above that of ethanedithiol which, at atmospheric pressure is 146° C. Subsequent to such distillation the product is typically ready for use.

The following examples illustrate the best embodiment of this invention in the preparation, and the products, of the dithiol curing agents.

Example 1

A two-liter flask is provided, with entry port for addition of reactant, stirring motor with glass shaft and impeller, heating mantle, nitrogen blanket, and reflux condenser. The flask is charged with 1128 grams, 12 gram moles, 1,2-ethanedithiol and to it is added one gram azobisisobutyronitrile. Stirring is begun under reflux nitrogen blanket is provided with slow replacement of vented nitrogen, and the flask contents is heated to approximately 70°.

At this temperature, dropwise introduction of 4-vinylcyclohexene is begun, from a total supply of 324 grams, 3 moles. Stirring, dropwise addition of 4-vinylcyclohexene, nitrogen blanket, and heating at about 70–80° C. is continued over a period of three to four hours. During this time, the temperature of the flask contents is closely monitored. When need for applied heat increases perceptibly, indicating a decline in rate of reaction, additional small portions of catalyst, from one half to one gram each, are added, for a total of approximately six grams.

When the addition of the vinylcyclohexene is complete, heating, stirring, nitrogen blanket, and reflux are continued for an additional approximately four hours to carry the reaction to completion.

Thereafter, the flask is disconnected from nitrogen blanket, reflux condenser, and stirrer, and is provided with a vacuum line connection, and a collection condenser. Strongly subatomsphere pressure is applied, and the flask contents is heated. Unconsumed ethanedithiol promptly boils, passes as a vapour to the condenser, and is collected for re-use. By observing the pool of flask contents, distillation is conveniently continued until evident ebullition becomes less noticeable and stops. Thereafter, the equipment is disassembled, the product being the pot contents.

In one preparation the procedures described led to the production of 829 grams of product with a Gardner viscosity of C, and falling-ball viscosity of 0.85 stokes. Upon analysis 19.5 percent of product weight was found to be in thiol (—SH) groups, and product to have a thiol equivalent weight of 169, corresponding to a molecular weight of 338, indicating an average value of $n$ of about 1.15.

Example 2

Substantially the procedures described, foregoing, are repeated, the only significant difference being in the amounts and ratio of reactants. Rate of addition of the diene is about the same, but addition of the smaller quantity takes less time.

The flask charge is 522 grams, 5.55 gram moles, ethanedithiol with about a half gram of azobisisobutyronitrile. To this is added 240 grams, 2.22 gram moles, vinylcyclohexene.

In one representative such prepration, 560 grams of product were obtained, having a thiol equivalent weight of 207, sixteen weight percent —SH, a Gardner viscosity of H and a falling ball viscosity of 2.0 stokes.

Example 3

Substantially the procedures described foregoing, are repeated, the only significant difference being in the amounts and ratio of reactants. Rate of addition of the diene is about the same, but addition of the smaller quantity takes less time.

The flask charge is 414 grams, 4.4 gram moles of ethanedithiol, with about a half gram of azobisisobutyronitrile. To this is added 216 grams, two gram moles, 4-vinylcyclohexene.

In one representative such preparation, 507 grams of product were obtained, having a thiol equivalent weight of 219, fifteen weight percent —SH, a Gardner viscosity of J and a falling ball viscosity of 2.50 stokes.

Example 4

Substantially the procedures described foregoing are repeated, the only significant difference being in the amounts and ratio of reactants. Rate of addition of the diene is about the same, but addition of the larger amount takes more time.

The flask charge is 2,482 grams, 26.4 gram moles, ethanedithiol with about a gram of azobisisobutyronitrile. To this is added 1,296 grams, 12 gram moles, vinylcyclohexene.

In one representative preparation, the procedures of this example yielded 3,020 grams of product of a thiol equivalent weight of 234, 14.1 weight percent of —SH, and a viscosity, not greatly different from those, foregoing, but not measured.

Example 5

Substantially the procedures described in the examples foregoing are repeated, the only significant difference being in the amounts and ratio of reactance.

The flask charge is 188 grams 1,2-ethanedithiol, and 1.5 grams azobisisobutyronitrile. Under substantially the conditions described, foregoing, and with continuous stirring, the flask charge is heated to approximately 73°. Thereafter, over three hours and 40 minutes, 216 grams vinylhexene are added, with stirring. The vinylcyclohexene is in amounts substantially equimolecular with that of the dithiol.

Cooling was not attempted, and during the addition of the cyclohexene reactant, the heat of reaction rose, autogenously, to 120° C. from exotherm of reaction.

Upon completion of combining the reactants, the product was transferred to another flask and thereafter flash distilled to remove unreacted starting materials, no careful attempt being made to isolate any pure individual products. The product resulting from the above procedures, in a representative preparation, had a Gardner viscosity of Z or a falling ball viscosity of 2.7 poises. The product was colorless to cloudy, and was found, on analysis, to have 4.9% of thiol. This corresponds to a molecular weight of approximately 1,350. The experiment is believed to have established that the empolyment of substantially equimolecular weights of starting lower alkanedithiol and vinylcyclohexene leads to products of molecular weights substantially higher than those achieved when the reactants are supplied in substantially dissimilar amounts: the product of this example contrasts with but is not part of the present invention.

Example 6

Into a glass lined pilot plant reactor vessel of approximately ten gallons capacity, provided with heating means, stirring means, inlet for inert gas blanket, and reflux condenser, as well as ports for the admission of reactants, was charged 26.1 pounds ethanedithiol, approximately 0.28 pound mole. About 3 ounces azobisisobutyronitrile was added thereto, and stirred in, nitrogen blanket and light nitrogen purge were established, and the reaction temperature was established. Thereto, with mixing and stirring, was slowly introduced 13.6 pounds, approximately 0.124 pounds moles, vinylcyclohexene. Reaction conditions were maintained for approximately a working day, and product thereafter flash distilled. As a result of these procedures, following distillation, there was obtained 30.4 pounds of product. For comparison, if the resulting product had been entirely a simple 2:1 product of the dithiol and vinylcyclohexene, product would have had a weight of 24.8 pounds. The product of this procedure was found to have a thiol equivalent weight to 211, and an actual average molecular weight of 422. In this situation, the average molecule represented somewhere between 2 and 3 recurring units in the generic formula herein foregoing.

The products of this invention are useful as epoxy resin curing agents, to react with a curable polyepoxide to obtain a cured resin of extraordinarily useful properties. They may be used alone, or as components of mixtures in which other curing agents, such as the curing agents known in the prior art, are also present. When used in a composition comprising also other reactive curing agents, especially desirable results are obtained when the other compound of such curing agent mixture than the dithiol of this invention is of a functionality of greater than 2 so that it can serve as a cross-linking agent. It is to be noted that no product of this invention is known ever to have had a functionality other than two.

When used alone as a curing agent for a polyepoxide to obtain an epoxy resin, any product of this invention may be employed. The amount to be employed should be such as to provide a number of —SH sites approximately equal to the number of oxirane rings in the polyepoxide. This is readily achieved, by reference to the epoxide equivalent weight, a specification commonly supplied by manufacturers of epoxy resins, and to the mercaptan or thiol equivalent weight of the product according to this invention, which is ascertained by routine methods of analysis, and providing reactive amounts of substances such that equivalent weights of each are supplied.

When employed in a mixture, comprising also curing agents for polyepoxides other than the dithiols mentioned, other components such as polyamides, diethylenetriamine, triethylenetetramine and others, may be chosen for the properties that they are known to confer upon the cured resin mixture, although in combination with the curing agent of this invention, superior properties are often times obtained from such mixtures as compared with properties of cured resins prepared from the prior art curing agents alone. Other such co-curing agents include mixtures of diethylenetriamine and aminoethylpiperazine, aromatic amines such as *m*-phenylenediamine, methylenedianiline, or 4,4'-diaminodiphenylsulphone, together with, if desired, small amounts, such as from 1 to 5 parts by weight per hundred parts by weight of polyepoxide to be cured, of a known curing accelerator including such tertiary amines as benzyldimethylamine, a proprietary product known familiarly in the epoxy resin art as "Dabco," which is 1,4 - Diazobicyclo(2·2·2)octane, N,N,N',N'-tetramethylethylenediamine, N,N,N',N' - tetramethylbutanediamine, N-methylmorpholine, tetramethylguanidine, a proprietary product known as DMP–30 or a quaternary ammonium hydroxide.

Whether the dithiols of this invention are used alone or whether they are used in mixture with other coreactive curing agents in the curing of polyepoxides to obtain epoxy resins, as a starting concept, approximately one reactive site in the co-curing agent, or dithiol should be present for each reactive site in the curable polyepoxide. In practice, this 1:1 functional equivalence need not be rigidly maintained, but may vary by about ¼ of its value in either direction.

When employing a mixed curing agent, comprising dithiol and a coreactive other substance such as amine curing agent, upon the basis of a total of one equivalent of curing agent, computed as to one equivalent of oxirane in polyepoxide, the amount of amine relative to the dithiol may range from approximately 0.05 to about 0.80 equivalents. It follows, then, that the dithiol can be present in the amount of approximately 0.95 to approximately 0.20 of the curing agent mixture. Within this range, good products of superior properties are obtained from the cure of standard, commercial polyepoxides, notably, but not exclusively, those of the type prepared by the reaction of epichlorohydrin with a bisphenol such an bisphenol A, in the presence of alkali. However, the indicated range of components in a mixed curing agent of the sort described generally gives better results when the ratio is from 0.05 to about 0.35 equivalents of amine for about 0.95 to about 0.65 equivalents of dithiol: for a total, in any event, of 1.

As is common in the art of curing epoxy resins, the polyepoxide cured to obtain an epoxy resin can be of any sort having an average of more than one 1,2-epoxyalkyl groups or the like, essentially, oxirane rings, per molecule. Included within such curable polyepoxides each of which acts in characteristic manner with the dithiol of this invention, or with dithiol of this invention in admixture with another known curing agent, to obtain an epoxy resin, are the diglycidyl ethers of the bisphenols including bisphenol A, bisphenol F and bisphenol S. Similarly, the epoxy novolaks are cured satisfactorily by the use of the dithiol of this invention or its mixture with other curing agents. Also, the polyglycols terminated by epoxyalkyl groups and commonly employed as flexibilizers in other epoxy resins or by themselves for flexible epoxy resins give good results when cured according to the present invention. Also, on the same basis as is true of the unhalogenated product, halogenated polyepoxides or mixtures thereof with unhalogenated polyepoxides are readily cured by reaction according to this invention.

In the prior art, numerous catalytic co-curing agents for epoxy resins are known, as well as various polyfunctional acid substances, of which the dicarboxylic acid types are the best known. The use of either purely catalytic curing agents such as boron trifluoride or its etherate or its other complex, is not recommended in conjunction with the curing agent of this invention. Some tendency exists, depending upon the employed amounts conditions, and precise identity of the co-reactants, for the catalytic curing agents to give rise to anomalous polymerization reactions which may lead to undesired products. The preferred co-reactant substances in curing of epoxy resins in according to this invention are, as has been mentioned above, those in which a nitrogen atom features prominently in the reactivity in the substance, whether by the presence upon it of reactive groups or reactive hydrogen atoms.

While the cured resins of this invention have been tested in many ways, two tests have been regarded as most important. They are called, respectively, the lap shear test and the T-peel test. They are performed on the same instrument, but since the results obtained differ by several orders of magnitude, the instrument is set up for each test with a strain gauge transducer particularly adapted to the range of values found in that test. In the lap shear test, calculations of results in pounds per square inch is simplified by the use of an accurately measured square inch of area, but other areas are usable with conversion factors, provided the area be not so small as to give atypical results.

In preparing samples for the test, two coupons each one inch wide and three inches long are taken, and routinely are cleaned with a strong organic solvent such as dichloromethane immediately prior to application of the adhesive, solvent is permitted to evaporate away, and on each sample coupon at an end, one square inch is coated with the adhesive material. The two coupons thus prepared are then brought together, in such position that the uncoated end of one projects away from the other. The one inch adhesive-coated areas are then brought together and pressed together firmly, excess adhesive, if any, is wiped away from the edges, and the adhesive is permitted to cure. Thereafter, the resulting assembly is tested for that force which is required to sunder the adhesive joint or break the material of the test coupon by direct longitudinal pull.

In practice, the exposed, uncoated end of one coupon is clasped firmly in fixed, mounted jaws at a top of a heavy frame, the jaws being attached to and mechanically coupled with a strain gauge transducer, which, in turn, is replaceable with other physically similar transducers of different values of recording range, transducers being suitably instrumented through electronic circuits so that the value sensed by the transducer appears as a tracing on a moving paper chart.

The other end of the two coupon assembly, also uncoated, is securely caught in another similar pair of heavy jaws, the second, or lower set of jaws being securely mounted on a descending cross bar frame member, lowerable by the co-rotation of heavy drive screws at either side of the machine frame. The drive screws are electrically operated at controllable speed, but in the tests of the present invention, they are typically operated to pull on the specimen at a speed of ½ inch per minute. With the coupons in their assemblies thus mounted one projecting upward and the other downward with the adhesive joint bonding them, the instrument is brought into operation. As the motor drive forces the lower frame member down, stress on the assembly and its adhesive joint is recorded as a rising line on a moving paper chart. At the point of failure, the rising line indicates pull necessary to cause failure, and then typically drops off to a low value or to null.

The nature of the failure is also observed; and, within the present invention, fiber glass reinforced plastic coupons have typically failed by delamination of the plastic material of which the coupon was composed rather than in the adhesive joint. When steel coupons have been used, the most typical failure has been the pulling away from the raw surface of the steel of a prime coat placed there by the manufacturer to protect it from rust while in handling and storage.

The second of the tests of a joint of an adhesive is performed on the same machine but with a somewhat different assembly.

Here, typically, one or two inches, preferably two, of one end of the surface of each one by three inch coupon are coated with adhesive, and the coupons are brought together so that the uncoated ends face one another. The adhesive joint is then pressed firmly together and held, excess adhesive being wiped away until the joint has set.

A tool is inserted between the uncoated ends which originally lie face to face, and they are parted. The coupons are then bent until the uncoated ends face each at a right angle away from the line of the coated and adhesive joined portions of the coupon, each in an opposite direction thus giving rise to the shape of the T, whence the name of the test method. With the coupon assembled in this fashion, the projecting tab from one coupon is attached in the upper jaw of the instrument herein before described while the downward projecting tab that remains is secured in the lower jaw of the same instrument. The appropriate strain gauge transducer is mounted in the top of the machine, and the instrument is placed into operation.

Making due allowance for the changed calibration, the instrument needle on the moving paper chart traces a line which rises abruptly to that stress at which the adhesive-bonded members begin to "peel" apart. Usually with minor fluctuations, the instrument reading remains approximately constant at this point throughout the duration of the pull until the separation of the two coupons has been completed.

Results of each of the tests are expressed in pounds; lap shear as pounds per square inch and T-peel as pounds per inch width. In the instance of the lap shear test, typical failure values represent from several hundred to a few thousand pounds per square inch. In the T-peel test, typical values are in fractions of a pound or a few pounds with fractional increments above.

These tests are widely used in industry for the evaluation of, for example, adhesive bonded joints and the like.

The curing of polyepoxides to obtain epoxy resins according to this invention is now described.

In curing an epoxy resin with a dithiol of this invention, the polyepoxide is mixed and blended intimately with the dithiol, or mixture of dithiol with an amine type co-reacting curing agent, there being supplied typically from about 0.75 to about 1.25 functional equivalents of each reactant for chosen amount of the other, that is to say, of curing agent for polyepoxide. Upon the completion of intimate mixing and blending together of these substances, they are placed in a mold if a molded product is desired, applied as a film if a coating is desired, or otherwise so disposed as to occupy the site upon which it is desired that the cured epoxy resin be present. Thereafter, the uncured mixture is heated to an epoxy resin curing temperature and maintained thereat for a period of time sufficient to assure the completion of cure. When it is desired to test for maximum properties that can be developed, prolonged cure times will be desired because, as it is well known in the art of curing epoxy resins, as a polyepoxide cures by reaction to obtain an epoxy resin, the resulting partially cured product becomes decreasing mobile with the result that the coalescence of reactive sites becomes mechanically increasingly difficult. While reaction to cure the present resin is prompt and efficient, it does not go forward so quickly as to present serious problems. Other than as herein noted, the curing of polyepoxide according to the present invention follows substantially the procedures that are well described in the prior art. The curing of a polyepoxide to obtain an epoxy resin is now given as in the form of a working example.

Example 7

In the present example, approximately 135 grams, which was calculated as being 0.8 equivalents of a dithiol according to this invention (the product of Example 1, foregoing), was intimately mixed and stirred with 0.2 equivalents of triethylenetetraamine, and to the resulting mixture was added two weight parts benzyldimethylamine per hundred parts polyepoxide to be cured. To the resulting mixture was added one equivalent of a commercial polyepoxide, the reaction product of epichlorohydrin and bisphenol A (p,p'-isopropylidenediphenol) and substantially the diglycidyl ether of bisphenyl A, relying upon the epoxide equivalent weight stated by the manufacturer in this instance, 186–192. The mixed curing composition based upon dithiol of this invention, and the polyepoxide, which was a viscous liquid, were intimately mixed and stirred, and the resulting mixture was applied as a coating to a clean, etched surface of an aluminum coupon for testing according to ASTM Method D–1002. The coated coupon surfaces were approximately in pairs, and pressed together, and the resulting assembly examined from time to time. Time to gel, that is to say, at which the product had become perceptibly hard was noted, and thereafter, the product was allowed approximately 72 hours at room temperature to achieve complete cure. At the end of this time, the coupons were tested for lap shear strength according to the method above indicated, and the lap shear strength was found to be 1,150 pounds per square inch.

Example 8

The present example repeats essentially the example foregoing, except that mixed with dithiol of this invention as co-reactive curing agent was a commercial fatty acid dimer polyamide sold under the designation DEH–14. The amount of that polyamide was 0.2 equivalent, as equivalent weight was indicated by the manufacturer. Gel time was found to be 25 minutes, and at the completion of 72 hours of cure, the product was found to have a lap shear strength measured as above indicated 1,320 pounds per square inch.

Example 9

This example substantially repeats the procedures of Example 7 except that, in place of 0.2 equivalents of triethylenetetraamine, there were employed 0.2 equivalents of diethylenetriamine. Gel time was found to be 32 minutes, and lap shear strength 980 pounds per square inch.

Example 10

Following the procedures set forth in U.S. Pat. 3,424,-719, 351 grams of a commercial polyepoxide, substantially the diglycidyl ether of bisphenol A, was reacted with 15 grams toluene diisocyanate. Of the resulting polyepoxide, modified as indicated, having approximately, a theoretical equivalent weight of 197, one equivalent weight was taken. To this were added one equivalent of a dithiol having an equivalent weight of 169 (the product of Example 1, foregoing) together with two weight parts benzyldimethylamine per hundred weight parts of polyepoxide to be cured. The resulting curable mixture was applied to the surfaces of aluminum coupons, and the coated surfaces approximated, and thereafter examined. At the end of 72 hours curing time, the product of this example was found to have a Shore D hardness of 56, a lap shear strength of 1,450 pounds per square inch, and a T-peel strength according to ASTM D–1876–69 of 1.7 pounds per inch width.

Example 11

The present example repeated essentially the procedures of Example 10, foregoing, except that the dithiol was the product of Example 2 herein foregoing, and the product was found to have a Shore D hardness of 41, lap shear strength of 1,225 and a T-peel strength of 2.5 pounds per inch width.

Example 12

The present example was carried out in procedures essentially the same as those of Examples 10 and 11 foregoing, except that the employed dithiol was the product of Example 3, foregoing, having a thiol equivalent weight of approximately 219. The resulting product had a Shore D hardness of 36, a lap shear strength under the indicated test of 1,125 pounds per square inch, and a T-peel strength of 4 pounds per inch width.

Example 13

The present example was carried out employing exactly the procedures employed in Examples 10, 11, and 12 except that, to test a product of the prior art, the dithiol was employed which had been prepared accordingly to the Coffman Patent mentioned, foregoing. The product had a molecular weight of approximately 1,348, and by corollary, an equivalent weight of approximately 674. Upon the completion of cure time under exactly the procedures which obtained the cures mentioned in the Examples 10, 11, and 12 foregoing, the product was not found to have cured to any perceptible degree; it remained a viscous liquid which was readily wiped away without the aid of solvent and was readily soluble in solvent. This example represents a part of the invention leading to the conclusion that molecular weight of the dithiol, which is a function of, among other things, the mole ratio of the starting materials employed and the conditions of the reaction, is essential and critical to the instant invention.

Thermoset polymers of this invention, of good properties, are obtained also when the instant dithiols are used to cure polyepoxides or mixtures of polyepoxides, the polyepoxide component having an average functionality greater than two.

Illustratively, mixtures were prepared, of which one component was a commercial novolak epoxide, either D. E. N. 431 with an epoxide equivalent weight of 172 to 179, or D. E. N. 438, of higher viscosity and of an epoxide equivalent weight of 175 to 182: and the other component was, in strict nomenclature, 3-(epoxyethyl)-7-oxabicyclo[4·1·0]cycloheptane but which is more familiarly known as "vinylcyclohexenediepoxide," a well known difunctional polyepoxide.

Actual weights used were typically 0.05 or 0.1 gram equivalents, to reduce the demand for starting materials.

Example 14

One half equivalent of D. E. N. 431 and one half equivalent of vinylcyclohexenediepoxide were intimately mixed and blended together to obtain a curable polyepoxide mixture with an average functionality of about 2.1 oxirane sites per hypothetical average molecule. To this mixture was added an —SH equivalent amount of the product of Example 1, foregoing, together with tetramethyl guanidine in the amount of one weight part per hundred weight parts of the mixed polyepoxide. The resulting composition was intimately mixed and stirred together, and permitted to stand at room temperature for a period of time to cure. After an hour, much of its ultimate strength is achieved. After a day cure is regarded as being asymptotic with, and very close to, total.

The product of this example, when cured, was found to be a very tough, insoluble, flexible material, well adapted to be used as a sealant or poting agent, and a Shore A hardness of 50.

When essentially the same procedures are repeated except that the polyepoxide is D. E. N. 431 unmodified, a harder, less flexible resin is obtained: flexibility is susceptible of control by control of the equivalence ratio between difunctional polyepoxide and polyepoxide of higher functionality.

Example 15

This example substantially repeats Example 14, foregoing, except that the polyepoxide mixture is composed of D. E. N. 431 and a commercial product substantially the diglycidyl ether of Bisphenol A, in substantially the proportions recited above. The cured resin is hard, tough, insoluble, flexible.

Example 16

This example substantially repeats Example 15, except that with the D. E. N. 431 there are mixed equivalent weights of the said commercial diglycidyl ether of Bisphenol A and diglycidyl ether of tetrabromobisphenol A. The product, when cured, is darker, somewhat less flexible than that of Example 15, and does not sustain flame when ignited in air.

Example 17

This example repeats Example 14 except that the epoxy novolak is D. E. N. 438 as above described. Cure takes place during substantially the same time interval; the product has a Shore A hardness of 75 and is regarded as a cured resin of highly desirable properties.

Example 18

This example repeats Example 17, except that 0.6 equivalent of D. E. N. 438 is mixed with 0.4 equivalent of the vinylcyclohexenediepoxide. The higher content of polyfunctional epoxide results in a cured resin of less flexibility and greater hardness; in particular, it manifested a Shore A hardness of 80.

Throughout the instant specification and claims, the expression DMP-30 is used to designate, consistently and exclusively, the compound $\alpha^2,\alpha^4,\alpha^6$-tris(dimethylaminomesitol).

We claim:

1. Process of curing a polyepoxide having an average of more than one 1,2-epoxyalkyl groups per molecule, which is curable to obtain an epoxy resin, which comprises
  (A) Mixing from about 0.95 equivalents to about 0.20 equivalents of a compound of the formula

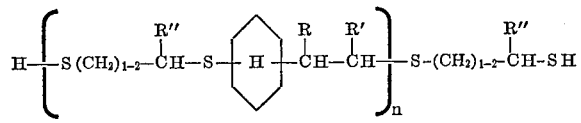

wherein $n$ is 1–5, one of R and R' is hydrogen and the other is hydrogen or methyl, and R" is hydrogen or methyl with the average molecular weight of product not above about 700 with from about 0.05 equivalents to about 0.80 equivalents of an amine or amide epoxy curing agent of functionality greater than 2, and
  (B) Combining the mixture of A with a polyepoxide having an average of more than one 1,2-epoxyalkyl groups per molecule that is curable to obtain an epoxy resin,
    the mixture being in proportion such that from about 0.75 to about 1.25 equivalents of the mixture of A is provided per equivalent of the polyepoxide and
  (C) Thereafter maintaining the resulting mixture at an epoxy curing temperature for a curing interval of time.

2. Process of Claim 1 modified in that, with the curing agent mixture there is included a cure-accelerating amount of an epoxy cure accelerator.

3. Process of Claim 2 modified in that the accelerator is benzyldimethylamine or 1,4-diazobicyclo(2·2·2)octane, or $\alpha^2,\alpha^4,\alpha^6$-tris(dimethylaminomesitol) or tetramethyl guanidine.

4. Process of Claim 2 in which the polyepoxide is one or a mixture of the condensation product of bisphenol A and epichlorohydrin, an epoxy novolak, or a diepoxyalkyl terminated polyglycol or the diepoxide of 4-vinylcyclohexene.

5. Product of the process of Claim 4.

6. Process of Claim 2 modified in that said epoxy cure accelerator is a tertiary amine.

References Cited

UNITED STATES PATENTS 3,625,925   12/1971   Oswald _____ 260—79
2,347,182   4/1944    Coffman _____ 260—79

OTHER REFERENCES

Ind. Eng. Chem., Vol. 48, No. 1, Cranker et al., Jan., 1956 (p. 98–103).

WILLIAM SHORT, Primary Examiner

T. E. PERTILLA, Assistant Examiner

U.S. Cl. X.R.

117—132 BE; 260—2 EC, 47 EC, 49, 59, 79